United States Patent [19]

Gupta

[11] Patent Number: 5,443,345
[45] Date of Patent: Aug. 22, 1995

[54] FASTENER-SLEEVE ASSEMBLY AND STRIP OF COLLATED FASTENERS

[75] Inventor: Harish C. Gupta, Naperville, Ill.

[73] Assignee: Illinois Tool Works Inc., Glenview, Ill.

[21] Appl. No.: 262,566

[22] Filed: Jun. 20, 1994

[51] Int. Cl.⁶ .................... F16B 15/00; F16B 15/08
[52] U.S. Cl. .................... 411/441; 411/442; 411/544; 411/923; 206/347
[58] Field of Search ............ 411/440, 441, 442, 443, 411/480, 482, 544, 823; 206/345–347

[56] References Cited

U.S. PATENT DOCUMENTS

| Re. 32,452 | 7/1987 | Nikolich | 123/46 |
|---|---|---|---|
| 4,403,722 | 9/1983 | Nikolich | 227/8 |
| 4,483,280 | 11/1984 | Nikolich | 123/46 |
| 4,932,821 | 6/1990 | Steffen et al. | 411/441 X |
| 5,069,340 | 12/1991 | Ernst et al. | 206/347 |
| 5,292,216 | 3/1994 | Van Allman | 411/441 |

FOREIGN PATENT DOCUMENTS

| 1095557 | 6/1955 | France . |
|---|---|---|
| 7144648 | 7/1972 | France . |
| 7834573 | 9/1979 | France . |
| 8701122 | 5/1988 | France . |
| 2524782 | 12/1976 | Germany . |
| 697129 | 9/1953 | United Kingdom . |

Primary Examiner—Neill R. Wilson
Attorney, Agent, or Firm—Mark W. Croll; Thomas W. Buckman; John P. O'Brien

[57] ABSTRACT

A strip of collated fasteners is disclosed, which comprises a plurality of fasteners and a carrier molded from a polymeric material. Each fastener has an elongate shank, which has a pointed end, and a head. The shank of each fastener defines an axis and has two portions of different diameters, namely a thicker portion adjoining the head and a thinner portion adjoining the pointed end, and a shoulder joining the thicker and thinner portions. The carrier comprises a separate sleeve associated with each fastener and is frangible between the separate sleeves. A representative sleeve is disposed around the shank of the associated fastener and has an initial axial length, which the representative sleeve assumes when disposed around the shank of the associated fastener but not compressed axially, and a critical axial length, at which the representative sleeve splits when disposed around the shank of the associated fastener and compressed axially. The thicker portion of the shank of each fastener has an axial length between the initial and critical lengths of the associated sleeve. The representative sleeve has a pair of outwardly opening, similarly curved, concave recesses, each having an open window, from which a portion of the shank of the associated fastener is visible.

11 Claims, 1 Drawing Sheet

U.S. Patent
Aug. 22, 1995
5,443,345
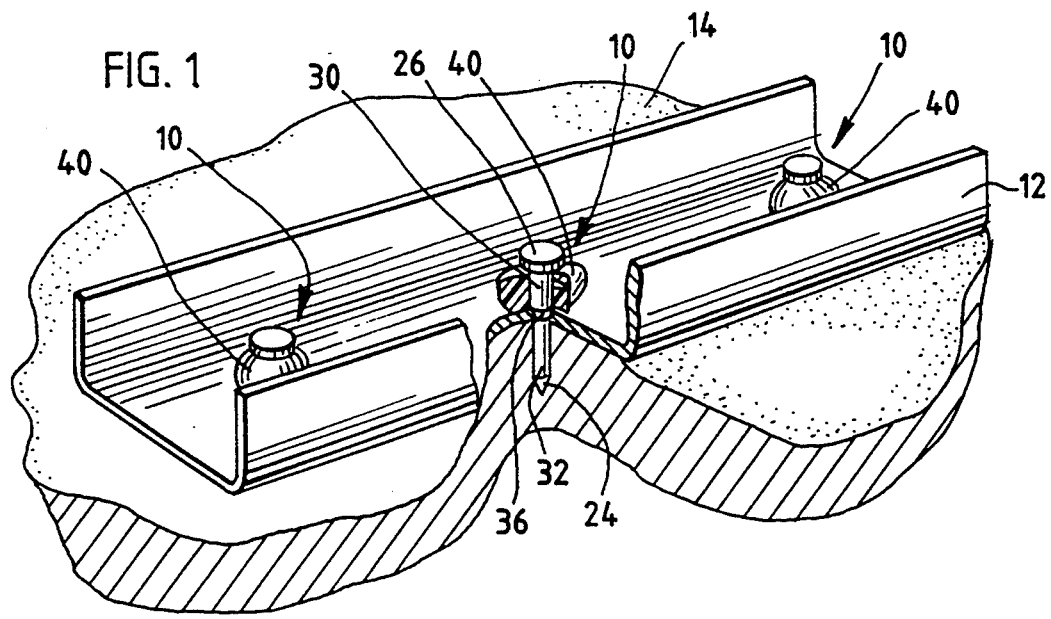
FIG. 1
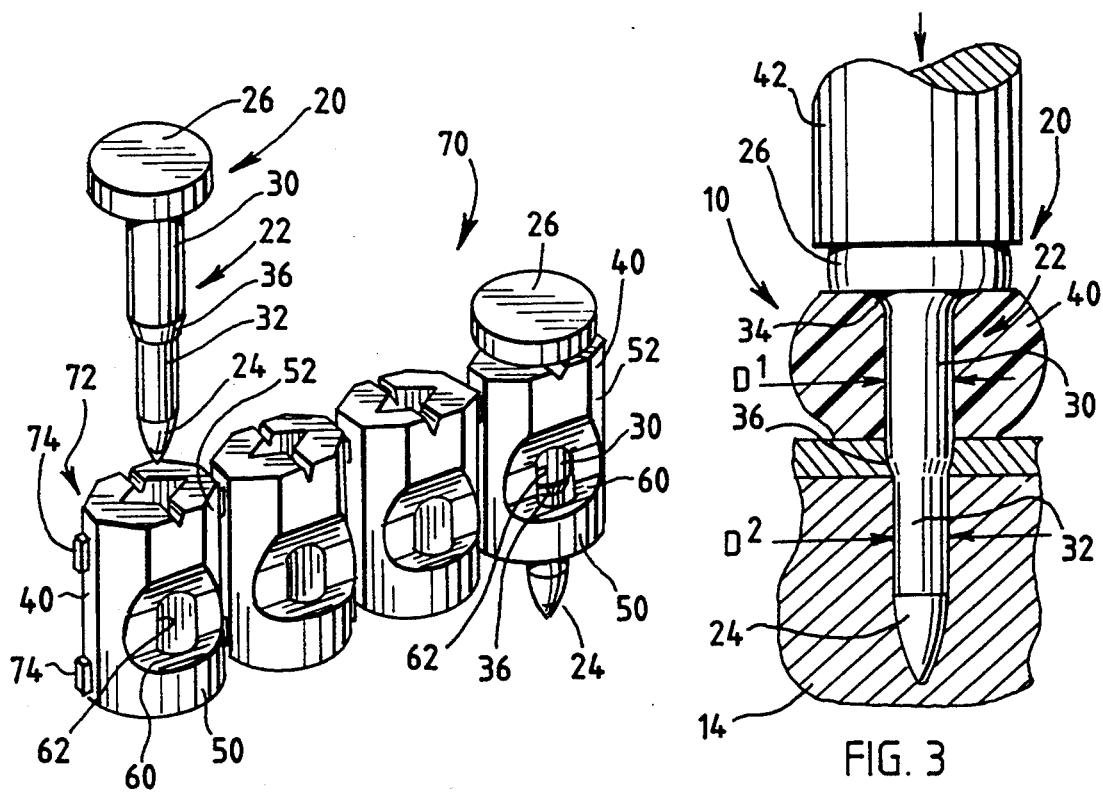
FIG. 2
FIG. 3

FASTENER-SLEEVE ASSEMBLY AND STRIP OF COLLATED FASTENERS

TECHNICAL FIELD OF THE INVENTION

This invention pertains to a fastener assembly comprising a fastener and a polymeric sleeve, and to a strip of collated fasteners for a fastener-driving tool, which may be pneumatically powered or combustion powered. The strip employs a polymeric carrier providing a polymeric sleeve for each fastener. Each fastener has an elongate shank with a thicker portion adjoining the head of such fastener and a thinner portion adjoining the pointed end of such fastener, the thicker portion having an axial length between an axially measured length of the associated sleeve and an axially measured length, at which the associated sleeve splits when compressed axially.

BACKGROUND OF THE INVENTION

Fastener-driving tools, which may be pneumatically powered or combustion-powered, are used widely for driving fasteners of a type having an elongate shank with a pointed end and having a head. Typically, such fasteners are designed to be forcibly driven through a workpiece, into a substrate. Such fasteners include nails designed to be forcibly driven into wood and drive pins designed to be forcibly driven into concrete, masonry, or steel. An exemplary use of such drive pins is for attaching metal channels, which are used to mount plasterboard walls, to steel substrates.

As exemplified in German Offenlegunsschrift No. 2,524,782, it is known for a fastener of the type noted above to have an elongate shank with two portions of different diameters, namely a thicker portion adjoining a head of the fastener and a thinner portion adjoining a pointed end of the elongate shank.

In Ernst et al. U.S. Pat. No. 5,069,340, a strip of collated fasteners of the type noted above is disclosed, which employs a carrier molded of a polymeric material. As stated therein, polypropylene is a preferred material for the carrier. As illustrated and described therein, each fastener is a drive pin having an elongate shank of a uniform diameter except at a pointed end of the drive pin, and except at a flared portion where the elongate shank adjoins a head of the drive pin.

Since the driving power of a combustion-powered tool of a type exemplified in Nikolich U.S. Pat. Nos. 4,403,722, 4,483,280, and Re. 32,452, the drive pins disclosed in Ernst et al. U.S. Pat. No. 5,069,340 typically is less than the driving power of a powder-actuated tool employing a powder charge, it has been a practical necessity heretofore to employ a powder-actuated tool employing a powder charge to drive a steel pin through a steel workpiece into a substrate.

This invention provides improvements over the pins and strip of collated fasteners illustrated and described in Ernst et al. U.S. Pat. No. 5,069,340, especially in relation to the ability of pins associated with the strip to penetrate steel when driven by a combustion-actuated tool of the type exemplified in the Nikolich patents noted above.

SUMMARY OF THE INVENTION

This invention provides a fastener assembly comprising a fastener and a polymeric sleeve of the type noted above. The fastener has an elongate shank with a pointed end and has a head. The sleeve is disposed around the elongate shank. The shank has two portions of different diameters, namely a thicker portion adjoining the head and a thinner portion adjoining the pointed end, and has a flared shoulder joining the thicker and thinner portions.

This invention takes advantage of a characteristic of the fastener, namely the characteristic that the shoulder tends to arrest the fastener when the fastener is driven through a workpiece, into a substrate. Thus, the shoulder does not penetrate more than superficially into the substrate, if the driving power of the fastener-driving tool driving the fastener is not excessive for the task at hand.

This invention takes advantage of a characteristic of the sleeve, namely the characteristic that the sleeve has an initial, axially measured length, which the sleeve assumes when disposed around the shank of the fastener, and a critical, axially measured length, at which the sleeve splits when disposed around the shank of the fastener and compressed axially.

This invention contemplates that the thicker portion of the shank has an axial length between the initial and critical lengths of the sleeve. Thus, the sleeve is compressed axially between the head of the fastener and the workpiece but does not split if the shoulder arrests the fastener when the fastener is driven through the workpiece, into the substrate.

In a preferred embodiment, the sleeve includes an upper portion nearer to the head and a lower portion nearer to the pointed end and has a pair of diametrically opposed, outwardly opening, similarly curved, concave recesses between the upper and lower portions, each recess having an open window, from which a portion of the shank of the fastener is visible.

This invention also provides a strip of collated fasteners. The strip comprises a plurality of fasteners, each being like the fastener described in the preceding summary, and a carrier molded from a polymeric material. The carrier comprises a separate sleeve associated with each fastener and is frangible between the separate sleeves. Each separate sleeve is like the polymeric sleeve described in the preceding summary.

Herein, such terms as "upper" and "lower" are used merely to refer to a fastener assembly or a strip of collated fasteners in a convenient orientation but not to limit the fastener assembly or the strip of collated fasteners to any particular orientation.

These and other objects, features, and advantages of this invention are evident from the following description of a preferred embodiment of this invention with reference to the accompanying drawings.

BRIEF DESCRIPTION OF THE DRAWINGS

FIG. 1 is a fragmentary, perspective view of a metal channel attached to a steel substrate by a plurality of similar fastener assemblies, each embodying this invention.

FIG. 2 is an enlarged, partly disassembled, perspective view of a strip of collated fasteners, the strip providing a plurality of the fastener assemblies and embodying this invention. FIG. 2 shows one side of the strip, the opposite side being similar to the side shown.

FIG. 3 is a further enlarged, cross-sectional view of one of the fastener assemblies, in which the fastener has been driven through the metal channel, into the steel substrate, by a driver blade of a fastener-driving tool.

The driver blade is shown fragmentarily and the fastener-driving tool is not shown otherwise.

DETAILED DESCRIPTION OF PREFERRED EMBODIMENT

As mentioned above, this invention provides improvements over the pins and strip of collated fasteners illustrated and described in Ernst et al. U.S. Pat. No. 5,069,340, the disclosure of which is incorporated herein by reference.

As shown in FIG. 1, a plurality of similar fastener assemblies 10 are used to attach a workpiece 12, such as a mild galvanized steel, U-shaped channel or track, to a substrate 14, such as a harder steel beam. Such a channel is used to mount plasterboard walls (not shown) in a known manner. In many instances, such a channel or track has a nominal thickness of 24 gauge (0.024 inch). In some instances, such a channel or track has a nominal thickness of 16 gauge (0.060 inch). Most loading on such a channel or track tends to shear the channel or track.

Each fastener assembly 10 comprises a fastener 20 having an elongate shank 22, which has a pointed end 24, and having a head 26. Moreover, the elongate shank 22 of each fastener 20 has two portions of different diameters, namely a thicker portion 30 having a larger diameter $D^1$ (preferably a diameter of about 0.112 inch and an axial length of about 0.25 inch) and adjoining the head 26 of such fastener 20 and a thinner portion 32 having a smaller diameter $D^2$ (preferably a diameter of about 0.092 inch) and adjoining the pointed end 24 of such fastener 20, a flared portion 34 where the thicker portion 30 adjoins the head 26 of such fastener 20, and a flared shoulder 36 joining the shank portions 30, 32. As shown, each fastener 20 is a drive pin, which is made from hardened steel.

Preferably, each fastener 20 has its pointed end 24 reshaped by barrel finishing such fastener 20 in a finishing medium for at least about ten hours, in a manner disclosed in a U.S. patent application filed simultaneously herewith by Don T. Van Allman et al. and assigned commonly herewith for STEEL PIN AND METHOD FOR ITS MANUFACTURE, the disclosure of which application is incorporated herein by reference.

Each fastener assembly 10 further comprises a polymeric sleeve 40, which is associated with the fastener 20 of such fastener assembly 10, and which is disposed around the elongate shank 22 of the associated fastener 20. As shown in FIGS. 1 and 3, the polymeric sleeve 40 is compressed axially between the head 26 of the associated fastener 20 and the workpiece 12 when the associated fastener 20 is driven through the workpiece 12, into the substrate 14.

As shown in FIG. 3, each fastener 20 with the associated sleeve 40 disposed around the shank 22 of such fastener 20 is driven by a driver blade 42 of a fastener-driving tool, which may be pneumatically powered or combustion-powered. The driver blade 50 is similar to the driver blade illustrated and described in the Ernst et al. patent referenced above. Reference may be had to the Ernst et al. patent referenced above for further details of the driver blade and associated components of the fastener-driving tool and for further information relating to such pneumatically powered and combustion-powered tools, which are well known.

Each polymeric sleeve 40 includes a lower, annular portion 50 and an upper, generally hexagonal portion 52, which is integral with the upper, annular portion 50.

Each polymeric sleeve 40 grips the elongate shank 22 of the associated fastener 20 with the lower portion 50 nearer to the pointed end 24 of the gripped shank 22 and with the upper portion 52 nearer to the head 26 of the associated fastener 20. Each polymeric sleeve 40 has a pair of diametrically opposed, similarly curved, concave recesses 60, one of which is shown in each polymeric sleeve 40 is FIG. 2. In one embodiment, the total length of the polymeric sleeve 40 is about 0.375 inch. Each such recess 60 has an open window 62, from which a portion of the elongate shank 22 of the associated fastener 20 is visible.

As shown in FIG. 2, the plurality of the fastener assemblies 10 are provided in a strip 70 of collated fasteners 20. Along with the fasteners 20, the strip 70 comprises a carrier 72, which is molded from the polymeric material noted above. The carrier 72 comprises a separate, polymeric sleeve 40 for each fastener 20 and is frangible between the respective sleeves 40. The carrier 72 is similar to the carrier illustrated and described in the Ernst et al. patent referenced above, to which reference may be had for further details not illustrated or described herein.

When the fastener 20 is driven through a workpiece, such as the workpiece 12, into a substrate, such as the substrate 14, it is a characteristic of the fastener 20 that the flared shoulder 36 tends to arrest the fastener 20. Thus, the flared shoulder 36 does not penetrate more than superficially into the substrate, if the driving power of the fastener-driving tool driving the fastener 20 is not excessive for the task at hand. Whether or not the shoulder arrests the fastener 20 can be empirically determined and depends upon such factors as the dimensions of the fastener 20, the surface roughness at the pointed end 24 and elsewhere on the fastener 20, the characteristics of the workpiece and of the substrate, and the driving power of the fastener-driving tool. Preferably, as mentioned above, the pointed end 24 is reshaped by barrel finishing the fastener 20 in a finishing medium for about ten hours.

Furthermore, it is a characteristic of the polymeric sleeve 40 that the polymeric sleeve 40 has an initial, axially measured length, which is about 0.375 inch in one embodiment and which the polymeric sleeve 40 assumes when disposed around the shank 22 of the associated fastener 20, and a critical, axially measured length, at which the polymeric sleeve 40 splits (in a manner illustrated and described in the Ernst et al. patent referenced above) when disposed around the shank 22 of the associated fastener 20 and compressed axially between the head 26 of the associated fastener 20 and a workpiece, such as the workpiece 12. The initial and critical lengths of a given sleeve disposed around the shank of a given fastener can be empirically determined.

This invention contemplates that the thicker portion 30 of the shank 22 of each fastener 20 has an axial length between the initial and critical lengths of the associated sleeve 40. In other words, the axial length of the thicker portion 30 is more than the initial length of the associated sleeve 40 but less than the critical length of the associated sleeve 40. Thus, when the fastener 20 is driven through a workpiece, such as the workpiece 12, into a substrate, such as the substrate 14, the associated sleeve 40 is compressed axially and bulges outwardly between the head 26 of the fastener 20 and the workpiece but does not split if the flared shoulder 36 arrests the fastener 20.

As an example, if the initial length of the polymeric sleeve 40 is about 0.375 inch, if the axial length of the thicker portion 30 of the associated fastener 20 is about 0.25 inch, if the nominal thickness of the workpiece 14 is about 0.024 inch, and if the flared shoulder 36 arrests the associated fastener 20 when the flared shoulder 36 has passed through the workpiece 14, the polymeric sleeve 40 can be thus compressed to a resulting length of about 0.225 inch.

Consequently, the associated sleeve 40 compressed axially and bulging outwardly between the head 26 of the fastener 20 and the workpiece provides a compressible washer, which helps to resist tearing of the workpiece from the substrate, particularly when the workpiece is subjected to loading that tends to shear the workpiece.

Various modifications may be made in the preferred embodiment described above without departing from the scope and spirit of this invention.

I claim:

1. A fastener assembly for attaching a workpiece to a substrate and comprising
   (a) a fastener having an elongate shank with a pointed end and having a head, the shank defining an axis and having two portions of different diameters, namely a thicker portion adjoining the head and a thinner portion adjoining the pointed end, the shank having a shoulder joining the thicker and thinner portions, and
   (b) a polymeric sleeve disposed around the elongate shank, the sleeve having an initial, axially measured length, which the sleeve assumes when disposed around the shank but not compressed axially, the sleeve having a critical, axially measured length, at which the sleeve splits when disposed around the shank and compressed axially,
   wherein the thicker portion of the shank has an axial length between the initial and critical lengths of the sleeve.

2. The fastener assembly of claim 1 wherein the sleeve includes an upper portion nearer to the head and a lower portion nearer to the pointed end and has an outwardly opening, curved, concave recess between the upper and lower portions.

3. The fastener assembly of claim 2 wherein said recess has an open window, from which a portion of the shank is visible.

4. The fastener assembly of claim 2 wherein said recess is one of a pair of diametrically opposed, similarly curved, concave recesses.

5. The fastener assembly of claim 4 wherein each of said recesses has an open window, from which a portion of the shank is visible.

6. A strip of collated fasteners, the strip comprising a plurality of fasteners and a carrier molded from a polymeric material, each fastener having an elongate shank with a pointed end and having a head, the shank defining an axis and having two portions of different diameters, namely a thicker portion adjoining the head and a thinner portion adjoining the pointed end, the shank having a shoulder joining the thicker and thinner portions, the carrier comprising a separate sleeve associated with each fastener and being frangible between the separate sleeves, a representative sleeve being disposed around the shank of the associated fastener, the representative sleeve having an initial, axially measured length, which the representative sleeve assumes when disposed around the shank of the associated fastener but not compressed axially, the representative sleeve having a critical, axially measured length, at which the representative sleeve splits when disposed around the shank of the associated fastener and compressed axially, wherein the thicker portion of the shank of each fastener has an axial length between the initial and critical lengths of the associated sleeve.

7. The strip of claim 6 wherein each sleeve includes an upper portion nearer to the pointed end of the associated fastener and a lower portion nearer to the head of the associated fastener and has an outwardly opening, curved, concave recess between the upper and lower portions.

8. The strip of claim 7 wherein said recess has an open window, from which a portion of the elongate shank of the associated fastener is visible.

9. The strip of claim 8 wherein said recess is one of a pair of diametrically opposed, similarly curved, concave recesses.

10. The strip of claim 9 wherein each of said recesses has an open window, from which a portion of the shank of the associated fastener is visible.

11. An assemblage comprising a steel substrate, a steel workpiece disposed against the substrate, a fastener having an elongate shank with a pointed end and having a head, the shank defining an axis and having two portions of different diameters, namely a thicker portion adjoining the head and a thinner portion adjoining the pointed end, the shank having a shoulder joining the thicker and thinner portions, and a polymeric sleeve disposed around the elongate shank, the fastener being driven through the workpiece, into the substrate, so that the shoulder is disposed approximately where the workpiece is disposed against the substrate and so that the sleeve is compressed axially and bulges outwardly between the head and the workpiece.

* * * * *